United States Patent
McKain

(10) Patent No.: US 7,451,239 B2
(45) Date of Patent: Nov. 11, 2008

(54) ACCESSING CONTENT SERVED BY A NETWORK PERIPHERAL

(75) Inventor: Frances Ruth McKain, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1113 days.

(21) Appl. No.: 10/272,859

(22) Filed: Oct. 16, 2002

(65) Prior Publication Data

US 2004/0078492 A1   Apr. 22, 2004

(51) Int. Cl.
*G06F 15/16* (2006.01)
(52) U.S. Cl. ...................... 709/250; 719/321
(58) Field of Classification Search ................. 709/250, 709/217, 219; 710/3, 8, 15, 62, 64, 12; 358/1.15; 719/321, 322, 326
See application file for complete search history.

(56) References Cited

U.S. PATENT DOCUMENTS

| | | | | |
|---|---|---|---|---|
| 6,209,048 B1* | 3/2001 | Wolff | ........................... | 710/62 |
| 6,311,165 B1* | 10/2001 | Coutts et al. | ................... | 705/21 |
| 6,591,310 B1* | 7/2003 | Johnson | ......................... | 710/3 |
| 2002/0093676 A1* | 7/2002 | Parry | ......................... | 358/1.15 |
| 2002/0188646 A1* | 12/2002 | Terrill et al. | ................. | 709/101 |
| 2003/0066066 A1* | 4/2003 | Nguyen et al. | .............. | 717/178 |

* cited by examiner

*Primary Examiner*—Frantz B Jean

(57) ABSTRACT

A common goal of developers is to make their products efficient and easy to use by the consuming public. Accordingly, embodiments of the present invention operate to make it easier for a user to access content served by a network peripheral. An interface enabling a user to select options for the network peripheral is generated. A driver for the peripheral includes, in the interface, controls enabling a user to request access to the content served by the peripheral.

12 Claims, 10 Drawing Sheets

ACCESSING CONTENT SERVED BY A NETWORK PERIPHERAL

FIELD OF THE INVENTION

The present invention generally relates to computer networks, and, more specifically, to providing an interface that enables a user to access a web server for a network peripheral.

BACKGROUND

To be useful, a computer peripheral traditionally had to be connected directly to a computer. Such connections were and are often accomplished through a parallel, serial, USB (Universal Serial Bus), SCSI (Small Computer System Interface), or IEEE 1394 port. IEEE is short for "Institute of Electrical and Electronics Engineers." More recently, manufacturers are building peripherals such as printers, scanners and facsimile devices that include hardware and programming enabling those devices to be connected directly to a computer network.

A networked peripheral provides a number of benefits. For example, it is more easily accessed by network users. Where a peripheral is connected to the parallel or USB port of a host computer, that peripheral can only be accessed by other computers on a network if the host computer is operational. A networked peripheral does not rely on the availability of a host computer. Instead, it can be accessed directly over the network.

Networked peripherals often include programming such as a web server that enable a user to directly access web pages or other content for configuring and accessing features offered by the peripheral. Web servers running on a peripheral are often times referred to as embedded web servers. An embedded web server for a particular peripheral is accesses by browsing to a network address assigned to that peripheral. The network address is often an IP (Internet Protocol) address. An IP address consists of four groups of numbers separated by a decimal point or period—192.168.1.1—for example. IP addresses are difficult to remember. This is compounded by the fact that the IP address for a particular peripheral can change from time to time. This creates an unfortunate barrier making it difficult for users to fully utilize a networked peripheral.

SUMMARY

A common goal of developers is to make their products efficient and easy to use by the consuming public. Accordingly, embodiments of the present invention operate to make it easier for a user to access content served by a network peripheral. An interface enabling a user to select options for the network peripheral is generated. A driver for the peripheral includes, in the interface, controls enabling a user to request access to the content served by the peripheral.

DETAILED DESCRIPTION

Glossary

Figure 1:
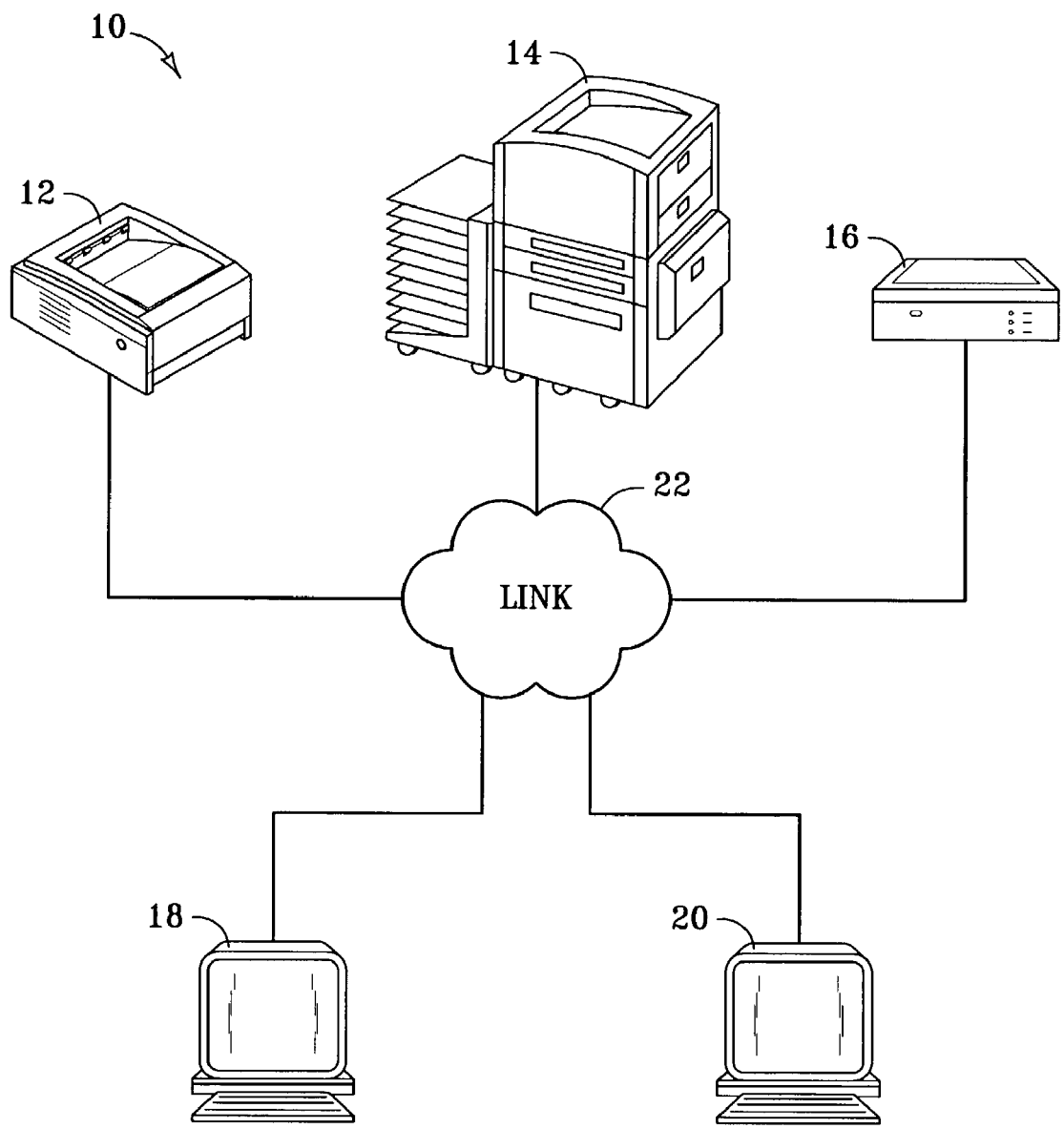
FIG. 1 is a schematic illustration of a network in which various embodiments of the present invention may be incorporated.

Program: An organized list of electronic instructions that, when executed, causes a device to behave in a predetermined manner. A program can take many forms. For example, it may be software stored on a computer's disk drive. It may be firmware written onto read-only memory. It may be embodied in hardware as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, programmable gate arrays (PGA), field programmable gate arrays (FPGA), or other components.

Client-Server: A model of interaction between two programs. For example, a program operating on one network device sends a request to a program operating on another network device and waits for a response. The requesting program is referred to as the "client" while the device on which the client operates is referred to as the "client device." The responding program is referred to as the "server," while the device on which the server operates is referred to as the "server device." The server is responsible for acting on the client request and returning requested information, if any, back to the client. This requested information may be an electronic file such as a word processing document or spread sheet, a web page, or any other electronic data to be displayed or used by the client. In any given network there may be multiple clients and multiple servers. A single device may contain programming allowing it to operate both as a client device and as a server device. Moreover, a client and a server may both operate on the same device.

Web Server: A server that implements HTTP (Hypertext Transport Protocol). A web server can host a web site or a web service. A web site provides a user interface by supplying web pages to a requesting client, in this case a web browser. Web pages can be delivered in a number of formats including, but not limited to, HTML (Hyper-Text Markup Language) and XML (extensible Markup Language). Web pages may be generated on demand using server side scripting technologies including, but not limited to, ASP (Active Server Pages) and JSP (Java Server Pages). A web page is typically accessed through a network address. The network address can take the form of an URL (Uniform Resource Locator), IP (Internet Protocol) address, or any other unique addressing mechanism. A web service provides a programmatic interface which may be exposed using a variety of protocols layered on top of HTTP, for example, SOAP (Simple Object Access Protocol).

Interface: The junction between a user and a computer program providing commands or menus through which a user communicates with the program. The term user represents generally any individual, mechanism, or other programming desiring to communicate with the program. For example, in the client-server model defined above, the server usually generates and delivers to a client an interface for communicating with a program operating on or controlled by the server device. Where the server is a web server, the interface is a web page. The web page, when displayed by the client device, presents a user with controls for selecting options, issuing commands, and entering text. The controls displayed can take many forms. They may include push-buttons, radio buttons, text boxes, scroll bars, or pull-down menus accessible using a keyboard and/or a pointing device such as a mouse connected to a client device. In a non-graphical environment, the controls may include command lines allowing the user to enter textual commands. Where the user is another program, an interface may be a programmatic interface.

Driver: A program that controls a peripheral. A driver acts like a translator between the peripheral and programs that use the peripheral. Each peripheral has its own set of specialized commands that only its driver knows. In contrast, most programs access peripherals by using generic commands. The driver, therefore, accepts generic commands from a program and then translates them into specialized commands for the peripheral.

Introduction: Product developers are embedding web servers in their network peripherals. Using content served by the peripheral, a user can configure and access features offered by the peripheral. A common goal of product developers is to make their products efficient and easy to use by the consuming public. It is expected that various embodiments of the present invention will make it easier for a user to access a peripheral's embedded web server.

FIG. 1 is a schematic diagram illustrating a network 10 in which the present invention may be incorporated. Network 10 includes peripherals 12-16 and computer work stations 18 and 20. Peripherals 12-16 each represent generally any combination of hardware and programming capable of providing an electronic service over network 10. In the example of FIG. 1, peripherals 12-16 are illustrated as a laser printer, a copier, and a scanner. Other examples include, but are not limited to, facsimile devices, data storage devices, networking hubs and routers. While network 10 is shown with three peripherals 12-16, network 10 may include any number of peripherals. Work stations 18 and 20 represent generally any computing devices that can utilize peripherals 12-16. For example, work stations 18 and 20 may be desktop computers, lap top computers, or PDAs (Personal Digital Assistants).

Workstations 18 and 20 and peripherals 12-16 are interconnected by link 22. Link 22 represents generally any cable, wireless, or remote connection via a telecommunication link, an infrared link, a radio frequency link, or any other connector or system that provides electronic communication between network components 12-20. Link 22 may represent an intranet, the Internet, or a combination of both. Components 12-20 can be connected to the network 10 at any point and the appropriate communication path established logically between the components. Each peripheral 12-16 is assigned a unique network address such as an IP (Internet Protocol) address. Work station 18 or 20 then accesses a particular peripheral 12, 14, or 16 over link 22 using that peripheral's network address.

Figure 2:
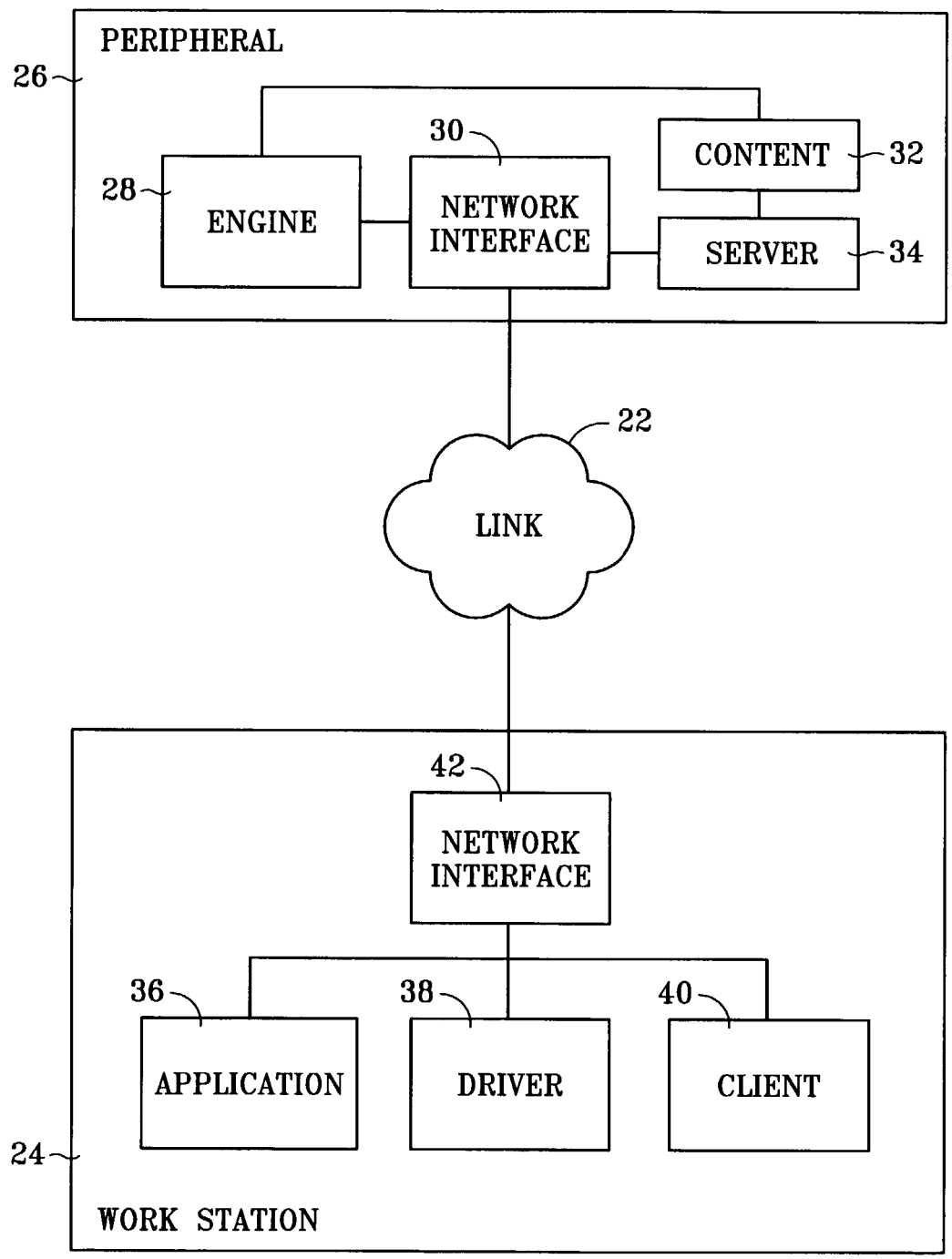
FIGS. 2 and 3 are block diagrams illustrating the present invention embodied in a driver for a network peripheral.

In the description that follows, the logical programming elements of the present invention will be described with reference to FIGS. 2 and 3. Steps taken to practice an embodiment of the present invention are then described with reference to FIG. 4. Finally, examples of two particular implementations of the present invention are described with reference to the screen views of FIGS. 5-10.

Elements: FIG. 2 is a block diagram illustrating a single work station 24 connected to a network peripheral 26. Work station 24 represents any one of the work stations of FIG. 1. Peripheral 26 represents any one of the peripherals shown in FIG. 1. Peripheral 26 includes engine 28, network interface 30, content 32, and server 34. Engine 28 represents generally any combination of hardware and programming responsible for performing the function or functions for which the peripheral is designed. For example, where peripheral 26 is a printer, engine 28 represents the hardware and programming responsible for printing a desired image on a sheet of paper. Network interface 30 represents hardware and programming responsible for routing instructions from work station 24 to engine 28 and server 34. Network interface 30 is also responsible for routing responses from server 34 to work station 24. Content 32 represents generally any programming and/or other electronic data for configuring or otherwise accessing features offered by engine 28. Using a network address assigned to peripheral 26, work station 24 accesses content 32 through server 34. It is expected that server 34 will be a web server and that content 32 will be a web site and/or a web service.

Work Station 24 includes application 36, driver 38, client 40, and network interface 42. Application 36 represents generally any programming capable of utilizing peripheral 26. For example, where peripheral 26 is a printer, application 36 may be a word processor. Where peripheral 26 is a data storage device, application 36 may be an operating system. Driver 38, while providing other functions described with reference to FIG. 3, represents generally any programming capable of controlling peripheral 26 at the direction of other programming running on work station 24. Client 40 represents generally any programming capable of interacting with server 34 to request access to content 32. Where, for example, server 34 is a web server, client 40 may be a browser. Network interface 42 represents hardware and programming responsible for routing instructions from driver 38 and client 40 to peripheral 26. Network interface 42 is also responsible for routing responses from server 34 back to client 40.

Figure 3:
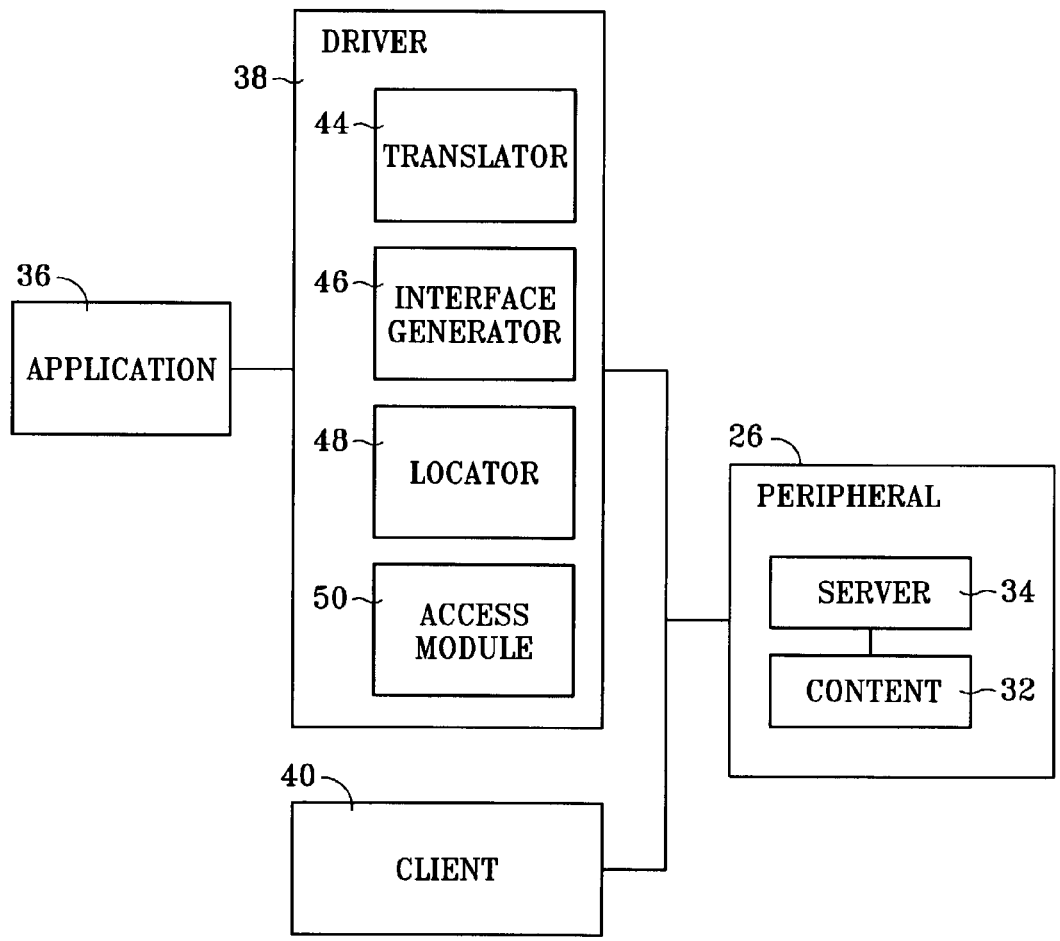

FIG. 3. illustrates the logical programming elements of driver 38 in more detail. Driver 38 includes translator 44, interface generator 46, locator 48, and access module 50. Translator 44 represents any programming capable of accepting generic commands from other programming and translating them into specialized commands for peripheral 26. Interface generator 46 represents generally any programming capable of generating an interface having user accessible controls for selecting options for peripheral 26 and user accessible controls for requesting access to content 32.

Locator 48 represents any programming capable of identifying the network address for peripheral 26. Access module 50 represents any programming capable of, upon direction received through an interface generated by interface generator 46, requesting access to content 32. To do so it is expected that access module 50 will direct client 40 to use an address identified by locator 48 to request server 34 to return content 32.

The present invention can be embodied in any computer-readable medium for use by or in connection with an instruction execution system such as a computer/processor based system or other system that can fetch or obtain the logic from the computer-readable medium and execute the instructions contained therein. A "computer-readable medium" can be any medium that can contain, store, or maintain programming for use by or in connection with the instruction execution system. The computer readable medium can comprise any one of many physical media such as, for example, electronic, magnetic, optical, electromagnetic, or semiconductor media. More specific examples of a suitable computer-readable medium would include, but are not limited to, a portable magnetic computer diskette such as a floppy diskette or hard drive, a random access memory (RAM), a read-only memory (ROM), an erasable programmable read-only memory, or a portable compact disc.

Operation: The steps taken to access content served by a network peripheral will be discussed with reference to FIGS. 3 and 4. Initially, a user, through application 36, accesses driver 38. Interface generator 46 generates an interface enabling the user to select options for network peripheral 26 (step 52). Locator 48 identifies a network address for accessing peripheral 26 (step 54). Interface generator 46 includes, in the interface, controls enabling a user to access content 32 served by peripheral 26 (step 56). Upon user direction provided through the interface, access module 50 requests access to content 32 using the identified network address (step 58).

The peripherals typically have network addresses, or IP addresses, that fall within a particular range—192.168.1.100 through 192.168.1.199 for example. To identify the network address for a peripheral in step 54, locator 48 may sequentially scan each address in the known range sending a request for each connected peripheral to identify itself. Locator 48 waits for a response from a current request before sending a request to a subsequent address. Locator 48 knows the type or identity of the peripheral whose address for which it is searching. When, in response to a request sent to a particular address, locator 48 receives a response identifying the appropriate peripheral, locator 48 then knows the address for the peripheral in question and can stop the search.

To request access to content 32 in step 58, access module 50 may pass the identified address to client 40 causing client 40 to request content 32. Where server 34 is a web server and content 32 is a web site and/or web server, client 40 is a browser. Access module 50 then passes an address such as http://192.168.1.110/content to client 40. Client 40 uses the address to request content 32 from server 34.

Figure 4:
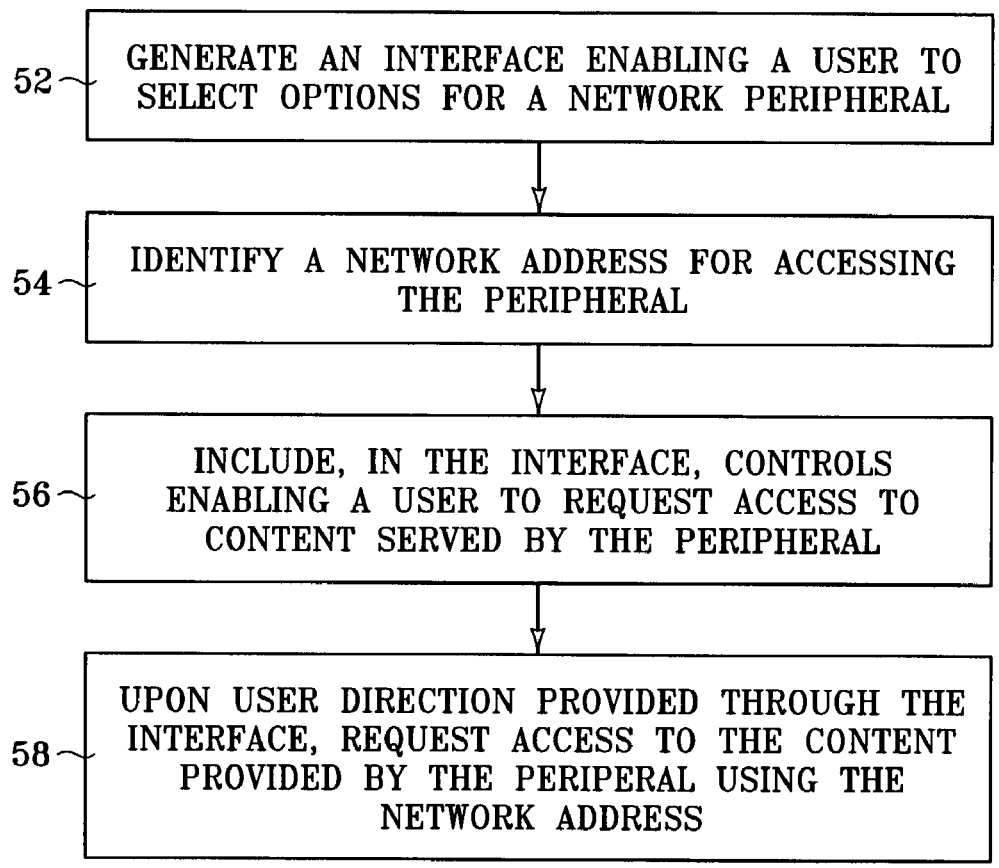
FIG. 4 is a flow diagram illustrating steps taken to practice an embodiment of the present invention.

Although the flow chart of FIG. 4 shows a specific order of execution, the order of execution may differ from that which is depicted. For example, the order of execution of two or more blocks may be scrambled relative to the order shown. Also, two or more blocks shown in succession in FIG. 4 may be executed concurrently or with partial concurrence. All such variations are within the scope of the present invention.

EXAMPLES

Figure 5:
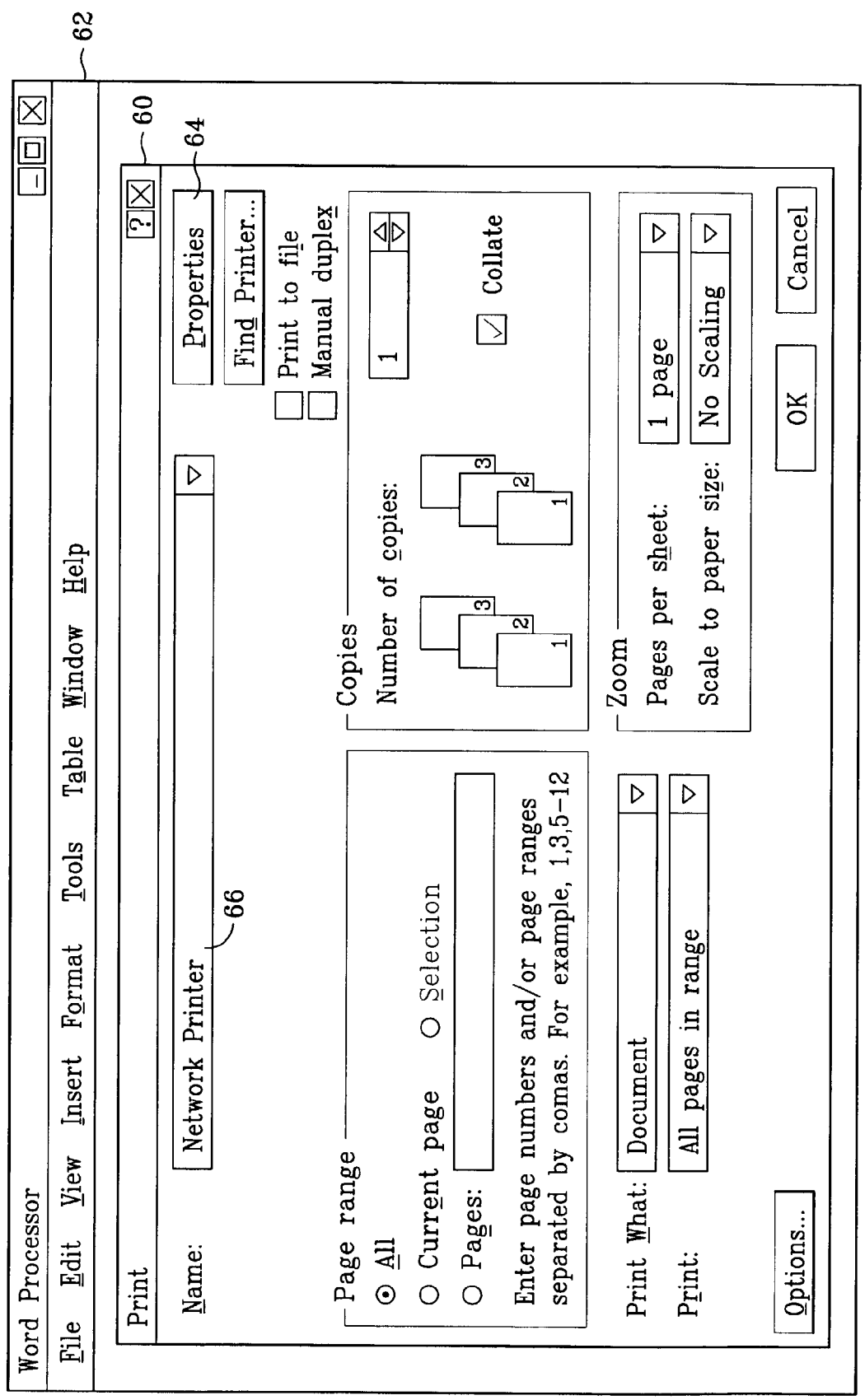
FIGS. 5, 6, and 7 are exemplary screen views illustrating a series of user interfaces through which a user traverses to access content served by a network peripheral according to an embodiment of the present invention.
Figure 6:
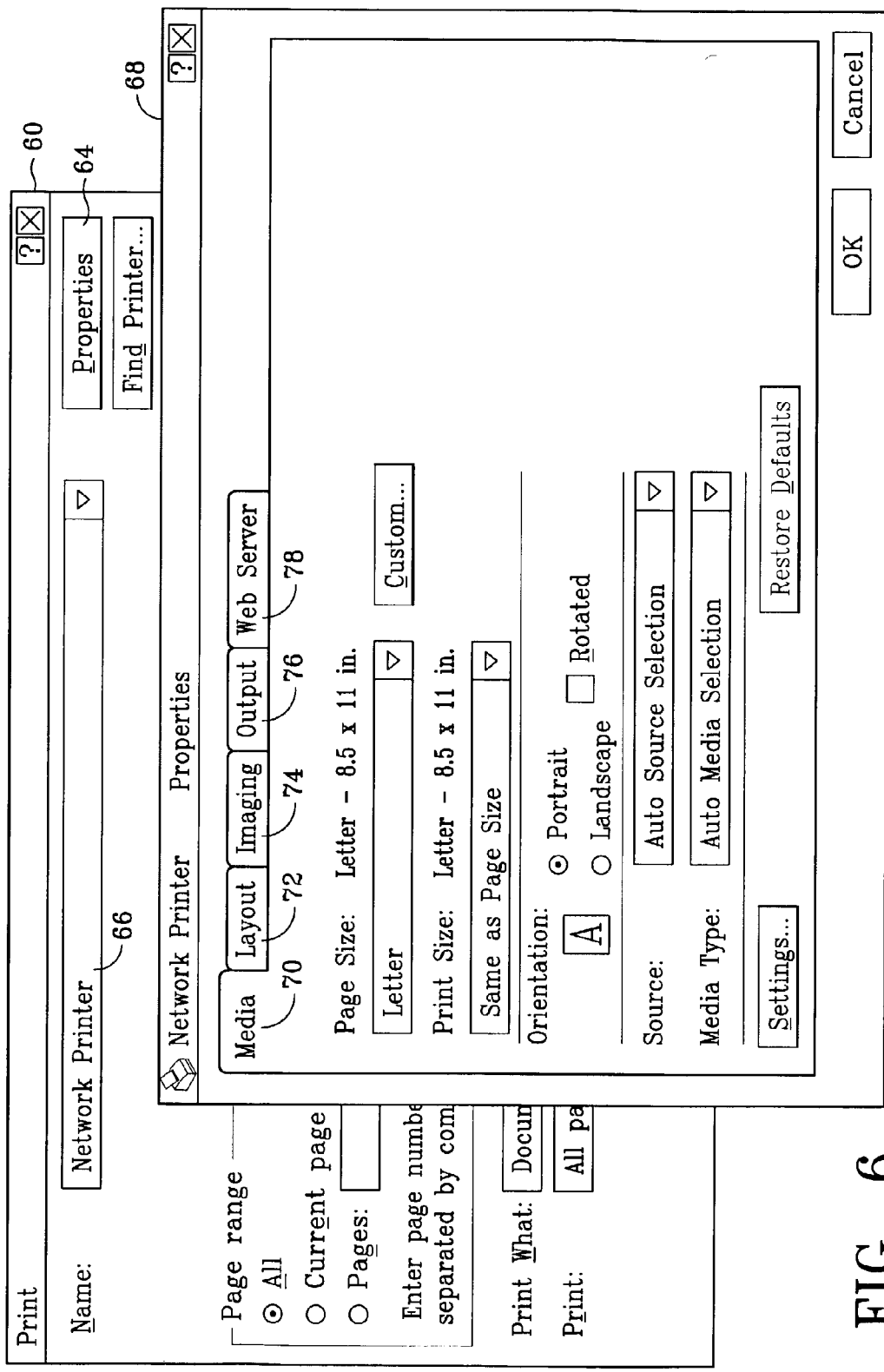

FIGS. 5-7 and 8-10 are exemplary screen views that provide examples of two implementations of the present invention. FIG. 5 is a screen view showing a print window 60 generated by a word processor 62. Print window 60 includes a properties command button 64 used to access a driver for a printer selected in pull down menu 66. Here, "Network Printer" has been selected. FIG. 6 illustrates properties window 68 for the network printer selected in pull down menu 66. Properties window 68 is generated by the driver for the network printer after a user selects properties command button 64.

Figure 7:
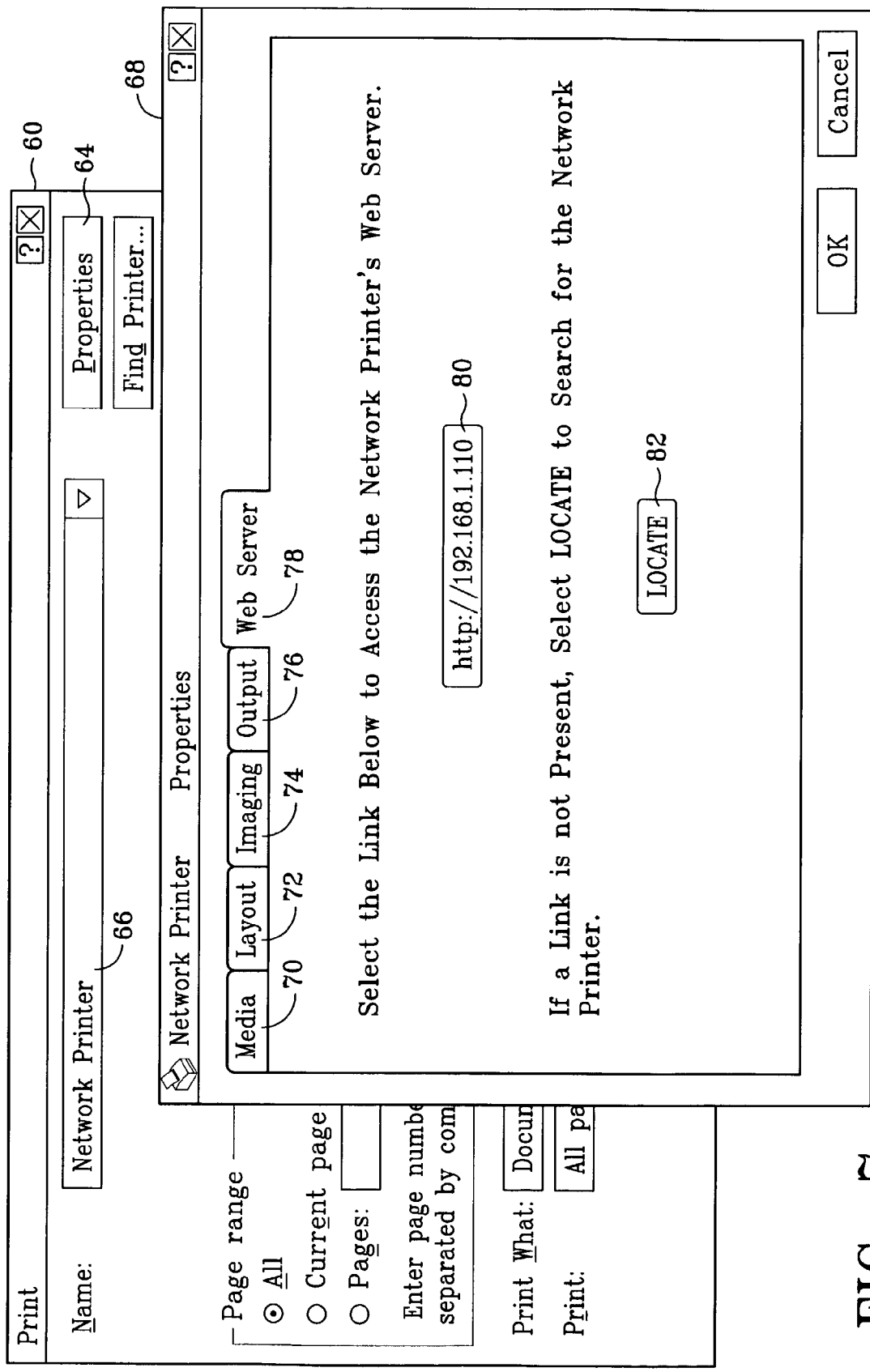

Properties window 68 includes a series of tabs 70-78. When a tab is selected, a group of controls are displayed. Those controls are for selecting options relating a particular purpose. In FIG. 6 media tab 70 is selected and controls for selecting options relating to the print media are displayed. In FIG. 7, web server tab 78 is selected and controls 80 and 82 for accessing content served by the network printer are displayed. Selecting address control 80 causes the driver for the network printer to request access to content 32 using a known network address for the network printer. Here the network address for the printer is "192.168.1.110." The address for accessing content 32 may be "http://192.168.1.110/content." Where address control 80 is not present and the address for the network printer is not known, a user may select locate control 82 which directs the driver for the network printer to identify the network address for the network printer. Alternatively, where an address for the network printer is not known, the driver may automatically seek to identify the address without user interaction.

Figure 8:
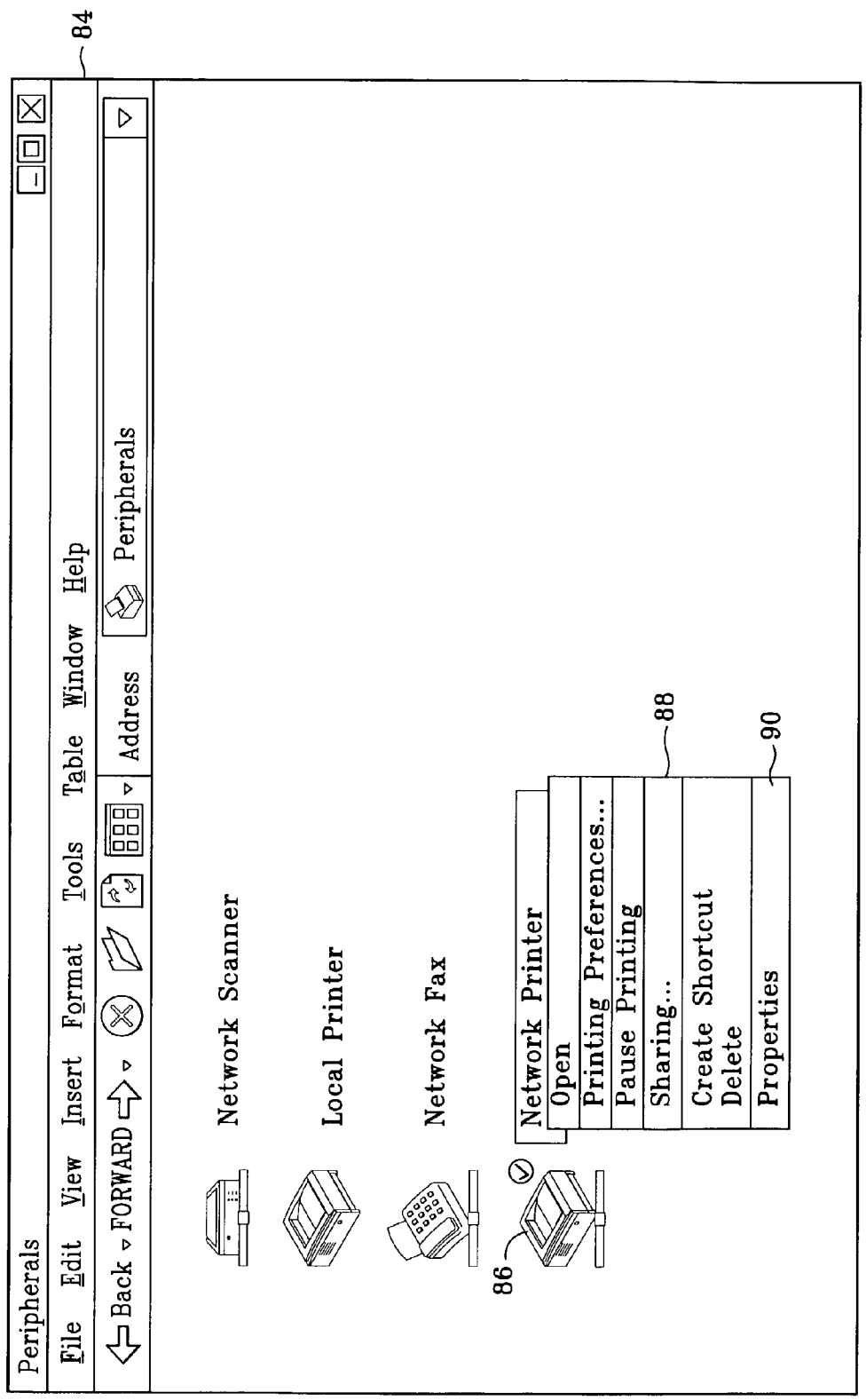
FIGS. 8, 9, and 10 are exemplary screen views illustrating a series of user interfaces through which a user traverses to access content served by a network peripheral according to another embodiment of the present invention.
Figure 9:
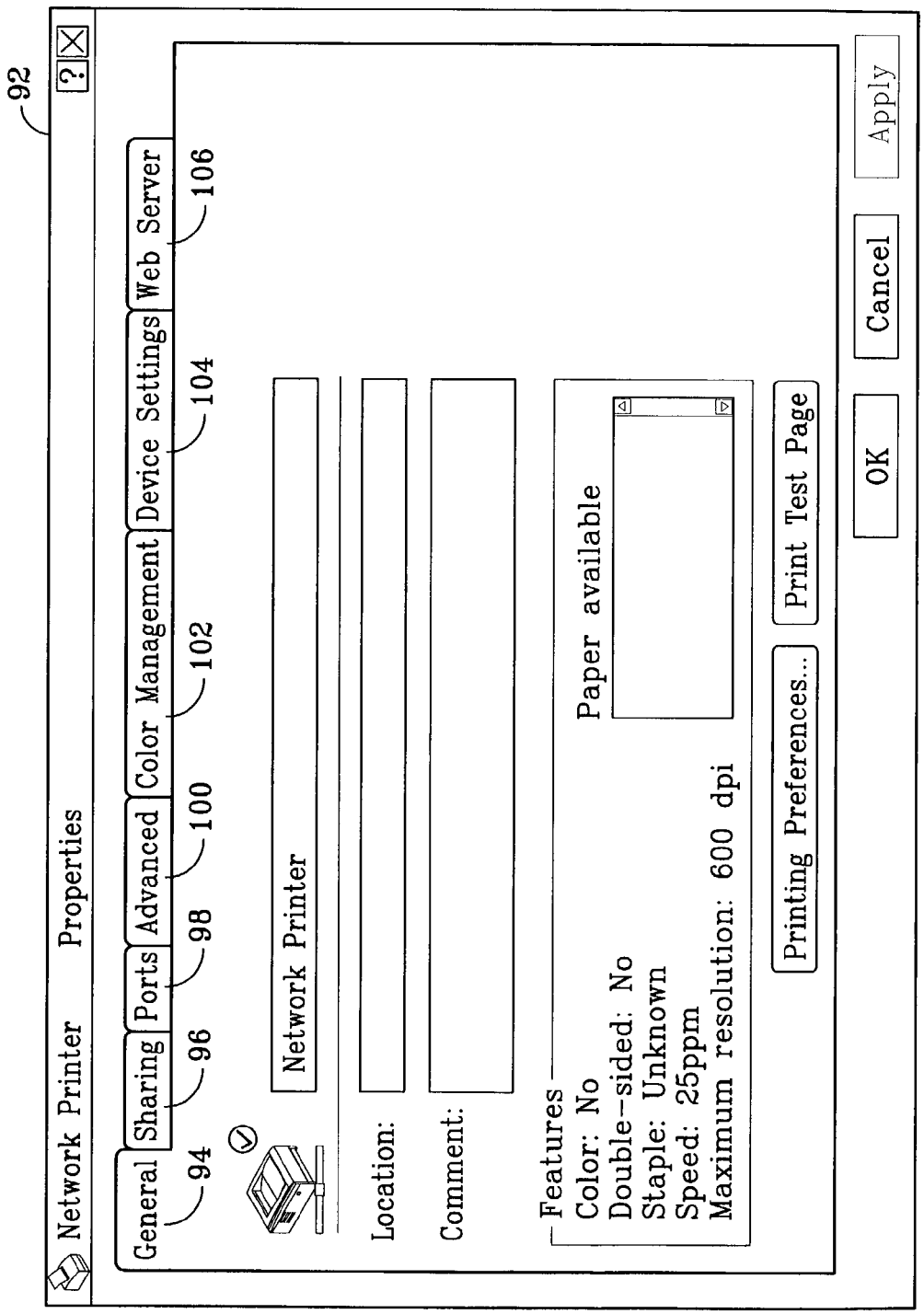
Figure 10:
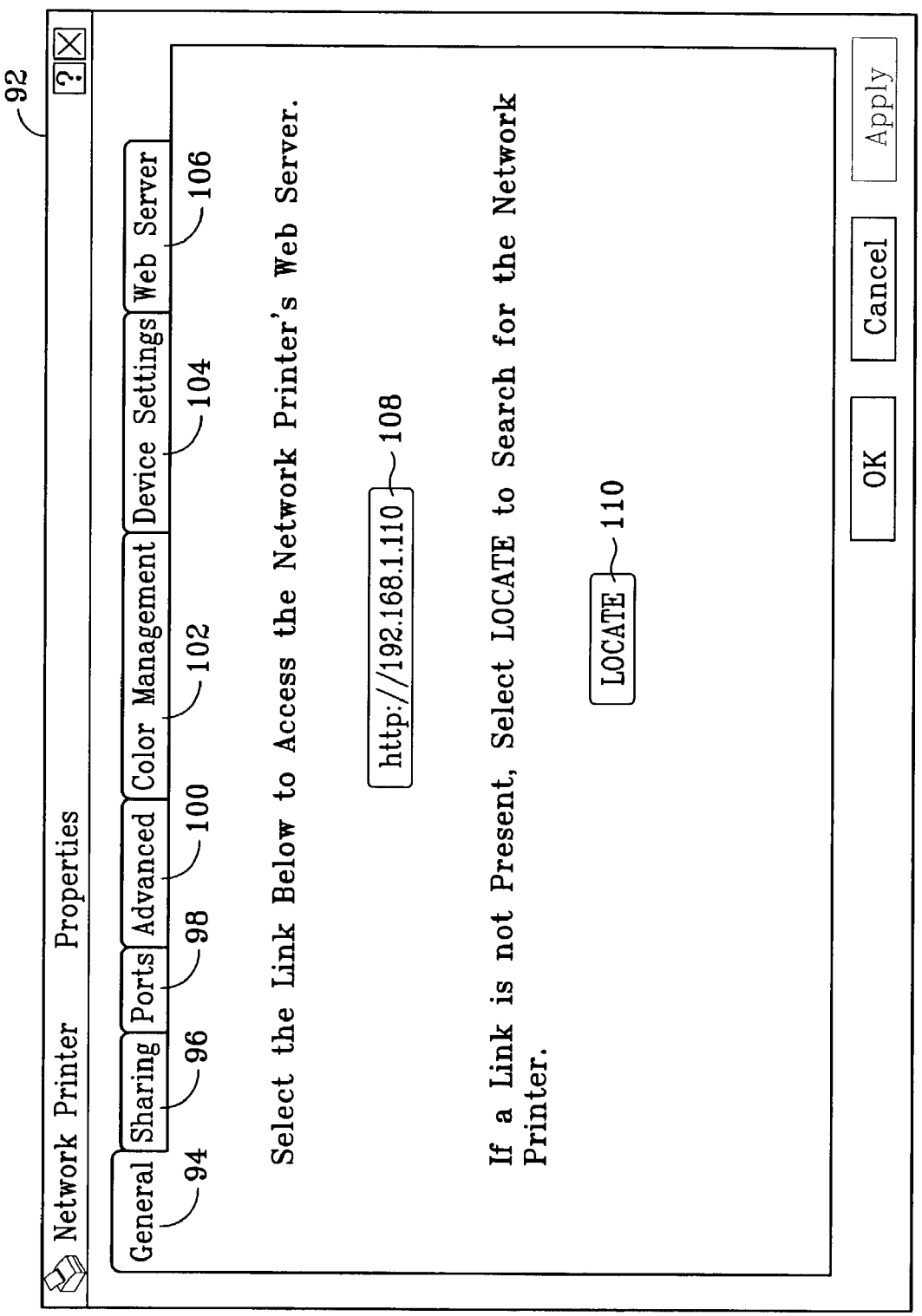

FIGS. 8-10 are screen views illustrating another implementation of the present invention. FIG. 8 shows a network peripherals window 84 generated by an operating system running on a workstation. While window 84 shows all network peripherals, it may instead be limited to certain types of peripherals such as printers and faxes. In the example of FIG. 8 icon 86 for the network printer has been selected revealing menu 88 from which properties 90 has been highlighted.

FIG. 9 reveals properties window 92 which includes a series of tabs 94-106. When a tab is selected, a group of controls are displayed. Those controls are for selecting options relating a particular purpose. In FIG. 9 general tab 94 is selected and general purpose controls for naming the printer, selecting printing preferences, and printing a test page are displayed. In FIG. 10, web server tab 106 is selected and controls 108 and 110 for accessing content served by the network printer are displayed. Selecting address control 108 causes the driver for the network printer to request access to content 32 using a known network address for the network printer. Where address control 108 is not present and the address for the network printer is not known, a user may select locate control 110 which directs the driver for the network printer to identify the network address for the network printer. Alternatively, where an address for the network printer is not known, the driver may automatically seek to identify the address without user interaction.

The present invention has been shown and described with reference to the foregoing exemplary embodiments. It is to be understood, however, that other forms, details, and embodiments may be made without departing from the spirit and scope of the invention, which is defined in the following claims.

What is claimed is:

1. A method for providing access to content served by a network peripheral, comprising:

a driver for the peripheral device, being executed by a computing device, generating an interface enabling a user of the computing device to select options for the network peripheral;

the driver identifying a network address for accessing the network peripheral;

the driver including, in the interface, controls enabling the user of the computing device to request access to the content served by the peripheral; and upon direction provided through the interface, the driver requesting access to the content using the network address.

2. A method for providing access to content served by a network printer, comprising:

a driver for the peripheral device, being executed by a computing device, generating an interface enabling a user of the computing device to select production options for the network printer;

the driver identifying a network address for accessing the network printer;

the driver including, in the interface, controls enabling the user of the computing device to request access to the content served by the network printer; and upon direction provided through the interface, the driver requesting access to the content using the network address.

3. Computer readable media storing a driver for a peripheral, the driver comprising instructions that when executed by a computing device cause the computing device to:
- generate an interface enabling a user of the computing device to select options for a network peripheral;
- identify a network address for accessing the network peripheral;
- include, in the interface, controls enabling the user of the computing device to request access to content served by the peripheral; and
- upon direction provided through the interface, request access to the content using the network address.

4. Computer readable media storing a driver for a peripheral, the driver comprising instructions that when executed by a computing device cause the computing device to:
- generate an interface enabling a user of the computing device to select production options for a network printer;
- identify a network address for accessing the network printer;
- include, in the interface, controls enabling the user of the computing device to request access to content served by the network printer; and
- upon direction provided through the interface, request access to the content using the network address.

5. A driver for a network peripheral stored on a computer readable medium and configured to be executed by a computing device, the driver comprising:
- an interface generator operable to cause a display by the computing device of an interface having user accessible controls for selecting options for the peripheral and for requesting access to content served by the peripheral;
- a translator operable to convert local instructions into peripheral specific instructions according to options selected through a generated interface; and
- an access module operable, upon direction provided through a generated interface, to request access to the content provided by the peripheral.

6. The driver of claim 5, further comprising a locator operable to identify a network address of the peripheral, and wherein the access module is operable, upon direction provided through a generated interface, to request access to the content provided by the peripheral using a network address identified by the locator.

7. The driver of claim 6 wherein the interface generator is further operable to cause a display by the computing device of an interface having user accessible controls for enabling a user to direct programming responsible for locating the network address for the peripheral.

8. The driver of claim 5, wherein the peripheral is a document production device and the interface generator is operable to cause a display by the computing device of an interface having user accessible controls for selecting production options and user accessible controls for requesting access to content served by the document production device.

9. The driver of claim 5, wherein the interface generator is capable of causing a display by the computing device of a peripheral properties interface having user accessible controls for selecting peripheral properties and user accessible controls for requesting access to content served by the peripheral.

10. A driver for a network peripheral stored on a computer readable medium and configured to be executed by a computing device, the driver comprising:
- an interface generator operable to cause a display by the computing device of an interface having user accessible controls for selecting options for a network peripheral and user accessible controls for requesting access to content served by the peripheral;
- a locator operable to identify a network address for accessing the peripheral;
- a translator operable to convert local instructions into peripheral specific instructions according to options selected through a generated interface; and
- an access module operable to, upon direction provided through a generated interface, request access to the content provided by the peripheral using an address identified by the locator.

11. In a computer network, a system comprising:
- a server operating on a network peripheral, the server operable to serve content relating to the operation of the peripheral;
- a driver for a network peripheral stored on a computer readable medium and configured to be executed by a computing device, the driver comprising:
- an interface generator operable to cause a display by the computing device of an interface having user accessible controls for selecting options for the peripheral and user accessible controls for requesting access to content from the server;
- a translator operable to convert local instructions into peripheral specific instructions according to options selected through a generated interface; and
- an access module operable to, upon direction provided through a generated interface, request access to the content from the server.

12. The system of claim 11, wherein the driver includes a locator operable to identify a network address for accessing the peripheral, and wherein the access module is further operable to, upon direction provided through a generated interface, request access to the content provided by the peripheral using an address identified by the locator.

* * * * *

UNITED STATES PATENT AND TRADEMARK OFFICE
CERTIFICATE OF CORRECTION

| | | |
|---|---|---|
| PATENT NO. | : 7,451,239 B2 | Page 1 of 1 |
| APPLICATION NO. | : 10/272859 | |
| DATED | : November 11, 2008 | |
| INVENTOR(S) | : Frances Ruth McKain | |

It is certified that error appears in the above-identified patent and that said Letters Patent is hereby corrected as shown below:

In column 6, line 14, delete "94106" and insert -- 94-106 --, therefor.

Signed and Sealed this

Eleventh Day of August, 2009

David J. Kappos
*Director of the United States Patent and Trademark Office*